H. HALL.
END GATE.
APPLICATION FILED NOV. 2, 1910.

1,006,937.

Patented Oct. 24, 1911.

Witnesses
W. N. Woodson
Juana M. Fallin

Inventor
Harvey Hall.

By H. W. H. Lacy, Attorneys.

COLUMBIA PLANOGRAPH CO., WASHINGTON, D. C.

UNITED STATES PATENT OFFICE.

HARVEY HALL, OF PAONIA, COLORADO.

END-GATE.

1,006,937.  Specification of Letters Patent. Patented Oct. 24, 1911.

Application filed November 2, 1910. Serial No. 590,375.

*To all whom it may concern:*

Be it known that I, HARVEY HALL, citizen of the United States, residing at Paonia, in the county of Delta and State of Colorado, have invented certain new and useful Improvements in End-Gates, of which the following is a specification.

This invention relates to end gates for wagons and other vehicles and has for its object the provision of a comparatively simple and thoroughly efficient device of this character, the construction of which is such that the gate may be securely locked in closed position without the employment of tie rods and similar auxiliary fastening devices.

A further object is to provide an end gate including pivotally united sections, one of which is provided with a reinforcing bar adapted to overlap and bear against the exterior face of the mating section when said sections are moved to operative position in engagement with the end cleats of a wagon body.

A further object is to provide a locking rod, one end of which is pivotally connected with the reinforcing bar at one side of the pivotal junction of the gate sections, while the other end thereof is formed with a hook adapted to engage an eye or loop secured to the wagon body so that when the free end of the reinforcing bar is moved in the direction of the adjacent gate section, the rod will exert a longitudinal pull on the eye and thus firmly clamp the gate sections in closed position.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

Figure 1:
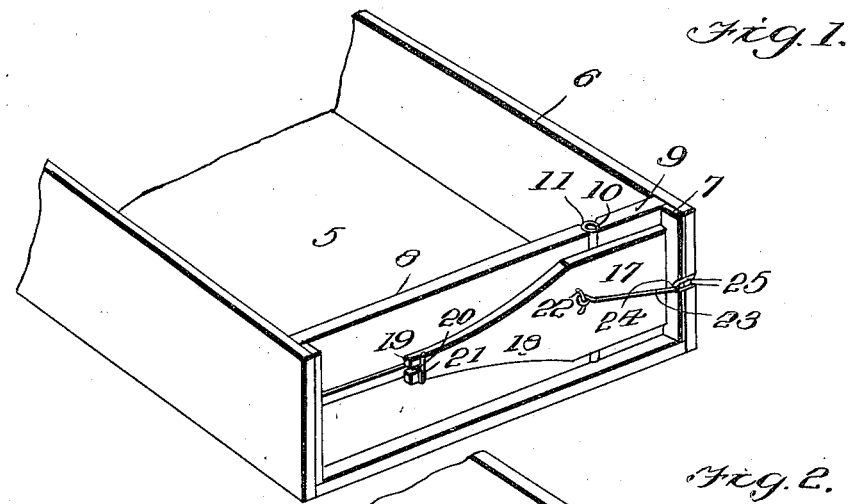
Figure 2:
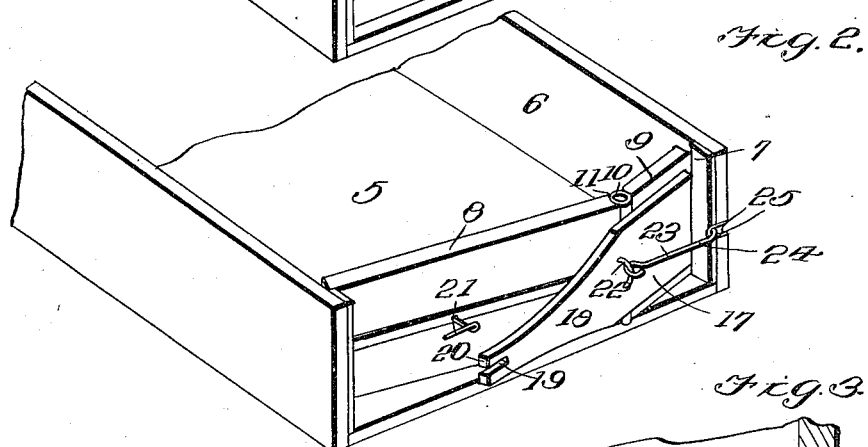
Figure 3:
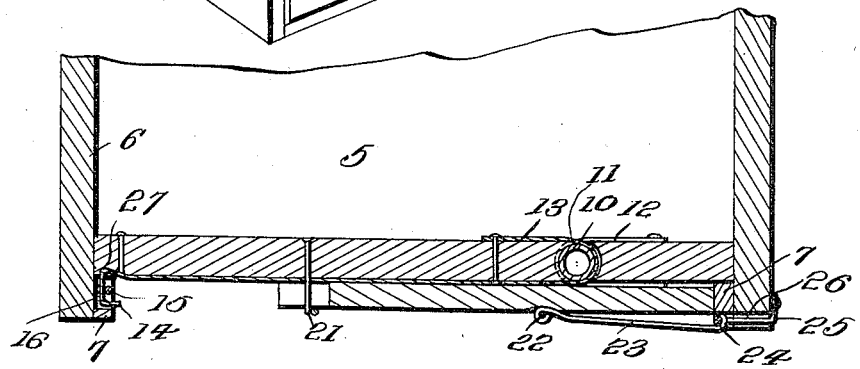
Figure 4:
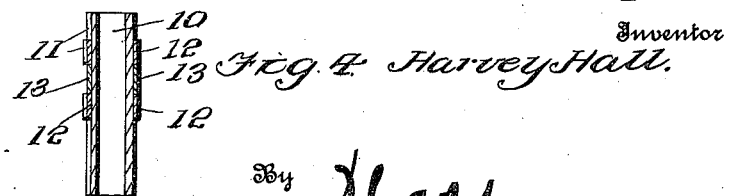

For a full understanding of the invention and the merits thereof, reference is to be had to the following description and accompanying drawings, in which:

Figure 1 is a perspective view of a sectional end gate constructed in accordance with my invention, showing the sections thereof in extended or operative position; Fig. 2 is a similar view, showing the fastening device released and the end gate in position to be removed from the wagon body; Fig. 3 is a horizontal sectional view of Fig. 1; Fig. 4 is a vertical sectional view, showing the construction of the pivot pin.

Corresponding and like parts are referred to in the following description and indicated in all the views of the drawings by the same reference characters.

The improved end gate forming the subject matter of the present invention is principally designed for use in connection with wagons and other vehicles, and by way of illustration is shown in position on a wagon of the ordinary construction in which 5 designates the body portion, 6 the side walls and 7 the end cleats, rigidly secured to the inner faces of the side walls.

The end gate is preferably formed in two sections 8 and 9, said sections being of different lengths and having their abutting faces formed with vertically disposed concave seating recesses 10 for the reception of a pivot pin 11. The pivot pin 11 is preferably hollow and of the same length as the height of the gate sections so that the opposite ends of the pin will be disposed flush with the upper and lower longitudinal edges of said gate sections.

Secured to the inner face of the short section 9 are spaced strap irons 12 having their intermediate portions extended around the pivot pin 11 and secured to the outer face of said section, there being a single strap iron 13 interposed between the strap irons 12 and forming in effect a hinge. One end of the strap iron 13 is rigidly secured to the inner face of the section 8, while the other end thereof extends longitudinally on the outer face of the section 8 to the outer end thereof, where it is bent upon itself to form a hook 14 for engagement with a staple or eye 15 seated in a recess 16 in one of the end cleats 7, as shown.

Rigidly secured to the outer face of the short gate section 9, is a reinforcing bar 17, the free end of which overlaps the mating section 8 and is reduced to form a handle 18 having its end bifurcated at 19 for the reception of a turn button 20. The turn button 20 is preferably formed of a single length of wire, one end of which is provided with a head which bears against the inner face of the section 8, while the other end thereof extends through an opening in the strap iron 13 and is bent to produce an angularly disposed arm 21.

Secured to the outer face of the reinforcing bar 17 at one side of the pivotal junction of the sections 8 and 9, is a staple 22 to which is pivotally connected one end of a locking member or rod 23, the opposite end of which is bent to form a hook 24 adapted to engage a loop or eye 25 seated in a recess 26 intersecting the vertical edges of one of the end cleats and the adjacent side wall of the wagon body.

Thus it will be seen that by inserting the hook 14 in the staple 15 and causing the hook 24 to engage the loop 25 and then moving the operating handle 18 in the direction of the gate section 8, said sections will be moved to extended position, while the rod 23 will exert a longitudinal pull on the loop 25 and thus clamp the end gate in engagement with the cleats 7, said end gate being held in closed position by passing the turn button through the bifurcated end of the handle 18, as best shown in Fig. 1 of the drawing. In order to remove the end gate to permit the dumping of the load, it is merely necessary to release the turn button and swing the handle 18 outwardly when the hooked end of the locking rod will be disengaged from the eye or loop 25 and at the same time the short gate section 9 will be moved inwardly so as to permit the hook 14 to be disengaged from the staple 15 and the end gate removed from the wagon body.

The hook 14 is preferably seated in a recess or depression 27 formed in the outer face of the gate section 8.

It will here be noted that the turn button and locking rod are carried by the end gate, thus dispensing with the employment of the usual tie rods which often become lost or misplaced.

The device is extremely simple in construction and may be manufactured and placed on the market at a comparatively small cost.

Having thus described the invention, what is claimed as new is:

1. The combination with a wagon body having a loop secured thereto and opening through one side thereof, of a sectional gate forming a closure for one end of the wagon body, a bar secured to one of the gate sections, and a locking member pivotally mounted on one end of the bar and adapted to engage the closed end of the loop when the other end of said bar is moved inwardly, said locking member being movable out of engagement with the loop through the open end thereof when said bar is swung outwardly.

2. The combination with a wagon body including end cleats, of a gate engaging said end cleats and formed of pivotally united sections, a bar secured to one of the sections and having its free end overlapping the mating section, a loop secured to the wagon body and opening through one side thereof, a locking member pivotally mounted on the bar at one side of the pivotal connection between the gate sections and provided with a hook adapted to engage the closed end of the loop when the free end of the bar is moved inwardly, and a fastening device extending through one gate section and engaging the free end of the bar, said hook being movable out of engagement with the loop through the open end thereof when the fastening device is released and the free end of said bar swung outwardly.

In testimony whereof, I affix my signature in presence of two witnesses.

HARVEY HALL.

Witnesses:
W. N. WOODSON,
SAMUEL N. ACKER.

---

Copies of this patent may be obtained for five cents each, by addressing the "Commissioner of Patents, Washington, D. C."